United States Patent [19]

Lehrl et al.

[11] 4,403,109
[45] Sep. 6, 1983

[54] CONTROL ELEMENT FOR HIGH-VOLTAGE APPARATUS AND METHOD FOR THE MANUFACTURE OF A CONTROL ELEMENT

[75] Inventors: Hans Lehrl; Reinhard Schroth, both of Berlin, Fed. Rep. of Germany

[73] Assignee: Siemens Aktiengesellschaft, Munich, Fed. Rep. of Germany

[21] Appl. No.: 199,688

[22] Filed: Oct. 22, 1980

[30] Foreign Application Priority Data

Oct. 30, 1979 [DE] Fed. Rep. of Germany ....... 2944121

[51] Int. Cl.³ .................. H01B 3/00; B29H 9/06; B29C 17/00
[52] U.S. Cl. .................. 174/73 R; 174/73 SC; 174/143; 264/135; 264/236; 264/255; 264/267; 264/336; 264/347
[58] Field of Search ............. 174/73 R, 73 SC, 143; 264/135, 250, 255, 236, 347, 134, 336, 267

[56] References Cited

U.S. PATENT DOCUMENTS

| | | |
|---|---|---|
| 3,258,522 | 6/1966 | Bartos et al. ............... 174/73 R |
| 3,634,604 | 1/1972 | Lusk ........................... 174/73 R |
| 3,656,084 | 4/1972 | Malia .......................... 174/73 R |
| 3,692,922 | 9/1972 | Jugimoto et al. ............ 174/73 R |
| 3,725,846 | 4/1973 | Strain ......................... 174/73 R |
| 3,778,888 | 12/1973 | Clason ........................ 174/73 R |
| 3,796,821 | 3/1974 | Lusk ........................... 174/73 R |
| 3,800,064 | 3/1974 | Lusk ........................... 174/73 R |
| 3,808,352 | 4/1974 | Johnson ...................... 174/73 R |
| 4,035,534 | 7/1977 | Nyberg ....................... 174/73 R |
| 4,164,620 | 8/1979 | Hervig ........................ 174/73 R |

FOREIGN PATENT DOCUMENTS

| | | |
|---|---|---|
| 19385 | 4/1979 | Australia ..................... 174/73 R |
| 1490115 | 9/1972 | Fed. Rep. of Germany . |
| 2346567 | 6/1975 | Fed. Rep. of Germany .... 174/73 R |
| 2643197 | 8/1977 | Fed. Rep. of Germany . |
| 2606238 | 11/1977 | Fed. Rep. of Germany . |
| 2739600 | 3/1979 | Fed. Rep. of Germany .... 174/73 R |
| 1180713 | 2/1970 | United Kingdom ............ 174/73 R |
| 1213996 | 11/1970 | United Kingdom ............ 174/73 R |
| 1434719 | 5/1976 | United Kingdom ............ 174/73 R |

OTHER PUBLICATIONS

Anon., Joslyn Advertisement, Electrical World, vol. 186, #12 (12-15-1976), p. 22.

Primary Examiner—Willard E. Hoag
Attorney, Agent, or Firm—Kenyon & Kenyon

[57] ABSTRACT

A prefabricated control element for high voltage apparatus, which can be slipped onto a bare or an insulated conductor, especially for fittings for high voltage cables, in the form of an electrical insulator, in which conductive layers which follow each other in the axial direction of the conductor are embedded, engaging each other, having the form of funnels and likewise consisting of elastic conductive material and having a wall thickness of 0.005 to 0.5 mm.

In the manufacture of the control element, individual parts of the insulator are joined together with a material bond by means of the conductive layers which are made of a dispersion of carbon black enriched polymer.

6 Claims, 6 Drawing Figures

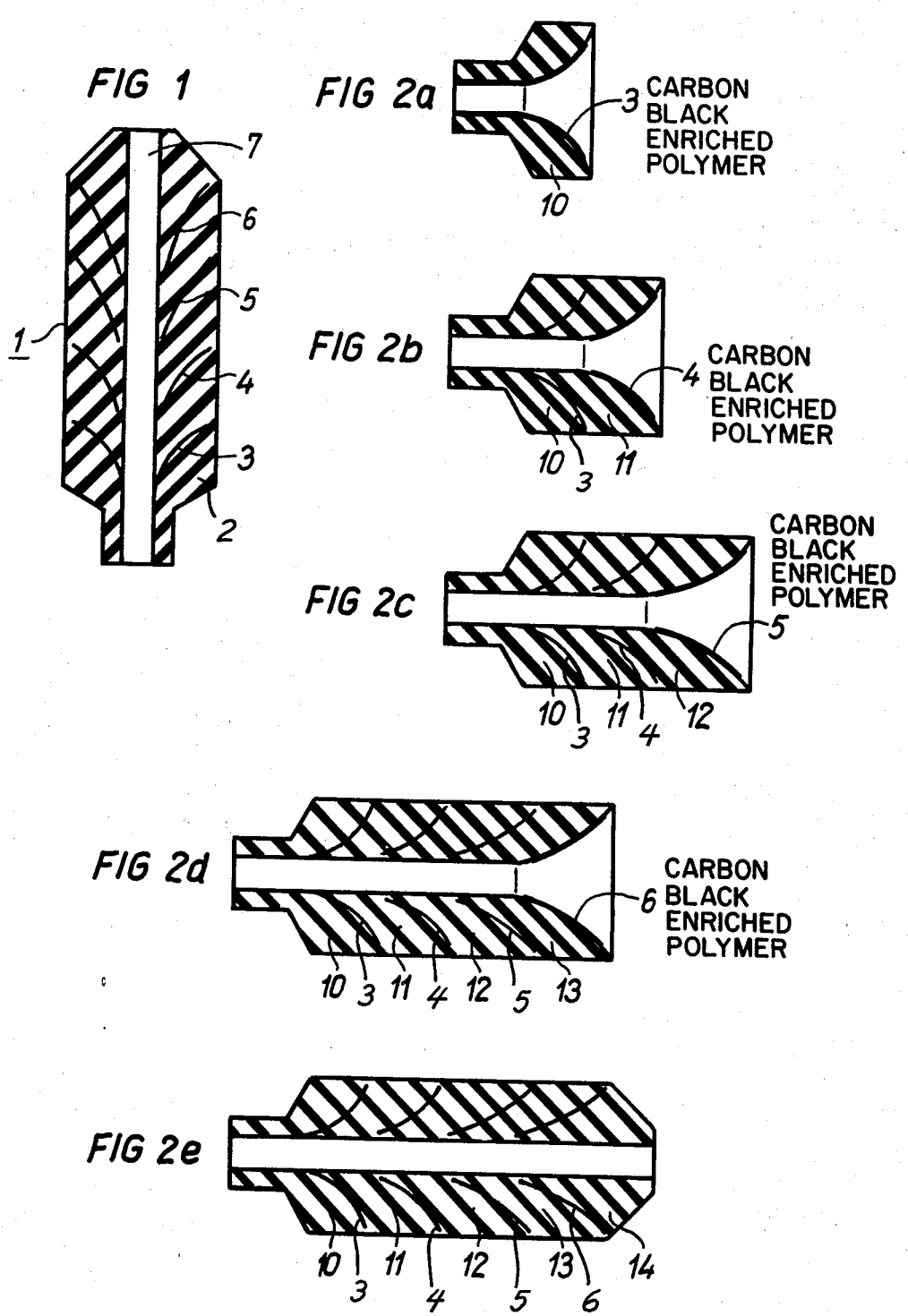

CONTROL ELEMENT FOR HIGH-VOLTAGE APPARATUS AND METHOD FOR THE MANUFACTURE OF A CONTROL ELEMENT

BACKGROUND OF THE INVENTION

This invention relates to fittings for high voltage purposes, such as prefabricated push-on control elements in general and more particularly to fittings for high voltage cables.

In high voltage apparatus, the need to control the electric field between the high voltage and ground in order to equalize sudden transitions and field strength peaks connected therewith frequently arises. In this connection, the so-called capacitive field control method, in which several electrodes are staggered relative to each other and where the first electrode is at ground potential and the last electrode is approximately at high voltage potential, is frequently used. Such capacitive field controls are customary, for instance, in high voltage feedthroughs and in fittings for high voltage cables.

In the mechanical design of fittings for high voltage cables, a transition to prefabricated parts which can merely be slipped onto the appropriately prepared cable end, by being expanded elastically, has been made to simplify the installation work. Thus, a prefabricated plug-on end termination for high voltage cables is known, for instance, which consists of several stacked insulators with deflectors of conductive material embedded in the insulating bodies. The individual parts of the termination can be made of silicone rubber (DE-OS No. 26 06 238).

For controlling the electric field in terminations of medium voltage cables, elastic insulators which contain only a single deflector are used. This deflector may be a prefabricated component, around which a cross-linkable silicone rubber compound is cast to manufacture the complete control element or the push-on fitting element (DE-AS No. 26 43 197, Nov. 24, 1977). The deflector (cone), however, can also consist of a homogeneous layer of an expandable electrically conductive material which is applied to an elastic cone carrier and is cemented to an elastic termination (DE-AS No. 14 90 115, July 3, 1969).

Starting out from a prefabricated control element which can be elastically expanded radially, for controlling the electric field in high voltage apparatus, especially in fittings of high voltage cables, which can be slipped onto a bare or insulated conductor and consists of several elastic insulators which follow each other in the axial direction and engage each other and are provided with funnel shaped end faces, and with which electrically conductive parts of likewise electric material are associated which together form a capacitive control, it is an object of the present invention to improve its dielectric strength by making the entire control element of one piece.

SUMMARY OF THE INVENTION

To solve this problem, it is provided, according to the present invention, that each electrically conductive part forms a layer 0.005 to 0.5 mm thick, which is arranged between the funnel shaped end faces of two insulators which are joined together with a material bond and is cemented or cross-linked or vulcanized thereto.

In a control element designed in this manner, the electrically conductive parts and the surrounding insulating material form a single part, the elements of which merge into each other without voids. The control element can therefore be handled as a whole in the installation and has no gaps of any kind which could lead to electrical disturbances. With a cylindrical or approximately cylindrical outside contour of the control element, the same contact pressure on the bare or insulated conductor is, incidentally, obtained, which prevents the formation of cracks in the boundary zone between the bare conductor or the insulated conductor and the control element.

According to the present invention, the procedure in manufacturing the control element is such that first, an insulator of cross-linkable or vulcanizable material is made and is at least partially cross-linked or vulcanized; that the insulator is thereupon completely or partly coated with an electrically conductive dispersion of a carbon black-enriched, cross-linkable or vulcanizable polymer plastic by single or repeated immersion or spraying; and that subsequently a further insulator is formed onto the surface of the insulator which has the electrically conductive surface, and is then fully vulcanized or cross-linked together with the first-named insulator and the electrically conductive coating.

BRIEF DESCRIPTION OF THE DRAWINGS

FIG. 1 is a schematic cross section of the control element of the present invention.

FIGS. 2a–e are a series of similar views illustrating the manufacturing method of the present invention.

DETAILED DESCRIPTION OF THE INVENTION

FIG. 1 shows a prefabricated control element 1 which can be slipped onto an insulated conductor, can be expanded elastically in the process and consists of an insulator 2 of elastic insulating material with control electrodes 3, 4, 5 and 6 of electrically conductive material embedded therein. The control electrodes 3 to 6 form a capacitive voltage control. The control element is provided with a longitudinal bore hole 7 which is provided for receiving a cable end.

Elastic insulating materials such as are commonly used nowadays for fittings for power cables may be considered as the material for the insulator 2. Among these are, for instance, rubbers of the mixed ethylene-polymerisate type and, in particular, also silicone rubbers. Particularly well suited are addition-cross-linkable silicone rubbers of the platinum-catalyzed, vinyl group containing polysiloxane type, the viscosity of which in the uncross-linked state at room temperature is 5 to 90 $Ns/m^2$ and preferably, 20 to 50 $Ns/m^2$, and which exhibit, after hardening, a Shore-A hardness of at most 35.

The electrically conductive layers 3 to 6, which preferably follow the desired equipotential lines of the high voltage field, have a thickness of about 0.2 mm and preferably consist of the same base material as the insulator 2. The base material is made electrically conductive by the addition of carbon black.

In the manufacture of the control element, an insulator 10 is first made, according to FIGS. 2a to 2e, which is subsequently coated with the electrically conductive layer 3, using a mask. On the insulator 10 is subsequently formed, according to FIG. 2b, the insulator 11. This is then coated with the electrically conductive layer 4, likewise using a mask. According to FIGS. 2c to 2e, further insulators 12, 13 and 14 as well as electrically conductive layers 5 and 6 are applied or formed onto previous layers in the same manner. After the entire body is made, the latter is fully cross-linked or vulcanized under heat, whereby the ultimate void-free connection of the individual elements to each other and among each other is made.

The control elements can also be manufactured starting with the insulator 14. However, one can also start with the insulator 10 as well as the insulator 14 and furnish the complete control element by forming an intermediate piece (for instance, the insulator 12) onto an upper part and a lower part. In any case, the stepwise procedure has the advantage that the conductor layers can be given different curvatures, whereby the design of the capacitive control can be optimized.

What is claimed is:

1. A method of manufacturing a control element to be slipped onto a bare or insulated conductor and elastically expanded, for controlling the electric field in high voltage apparatus, especially in fittings for high voltage cables, including a plurality of elastic insulators attached to each other and provided with funnel-shaped end faces and electrically conductive parts of likewise elastic material associated with said plurality of insulators and forming therewith a capacitive control, comprising:

(a) first, making a first insulator of cross-linkable or vulcanizable material with a funnel-shaped end face and at least partially cross-linking or vulcanizing said insulator;

(b) coating the funnel-shaped end face of said first insulator at least partly with an electrically conductive dispersion of a carbon black-enriched cross-linkable or vulcanizable polymer plastic;

(c) forming a further insulator with a funnel-shaped end face onto said electrically conductive dispersion and at least partially cross-linking or vulcanizing said further insulator;

(d) coating the funnel-shaped end face of said further insulator at least partly with a last coating of an electrically conductive dispersion of a carbon black-enriched cross-linkable or vulcanizable polymer plastic;

(e) forming a last insulator onto said last coating; and (f) fully vulcanizing or cross-linking the plurality of insulators and electrically conductive coatings.

2. A prefabricated control element to be slipped onto a bare or insulated conductor and elastically expanded, for controlling the electric field in high voltage apparatus, especially in fittings for high voltage cables, including a plurality of elastic insulators attached to each other and provided with funnel-shaped end faces and electrically conductive parts of elastic material associated with said plurality of insulators and forming therewith a capacitive control, each electrically conducting part forming a layer 0.005 to 0.5 milimeters thick arranged between at least a part of the funnel-shaped end faces of two insulators connected to each other with a material bond, made according to the method of claim 1.

3. The method of claim 1 wherein said step of coating comprises immersion of said first insulator in said electrically conductive dispersion.

4. The method of claim 3 wherein said immersion is repeated.

5. The method of claim 1 wherein said coating is spraying.

6. The method of claim 5 wherein said spraying is repeated.

* * * * *